Sept. 8, 1964     P. M. CAPASSO     3,147,505
WIPER DEVICE
Filed April 22, 1963
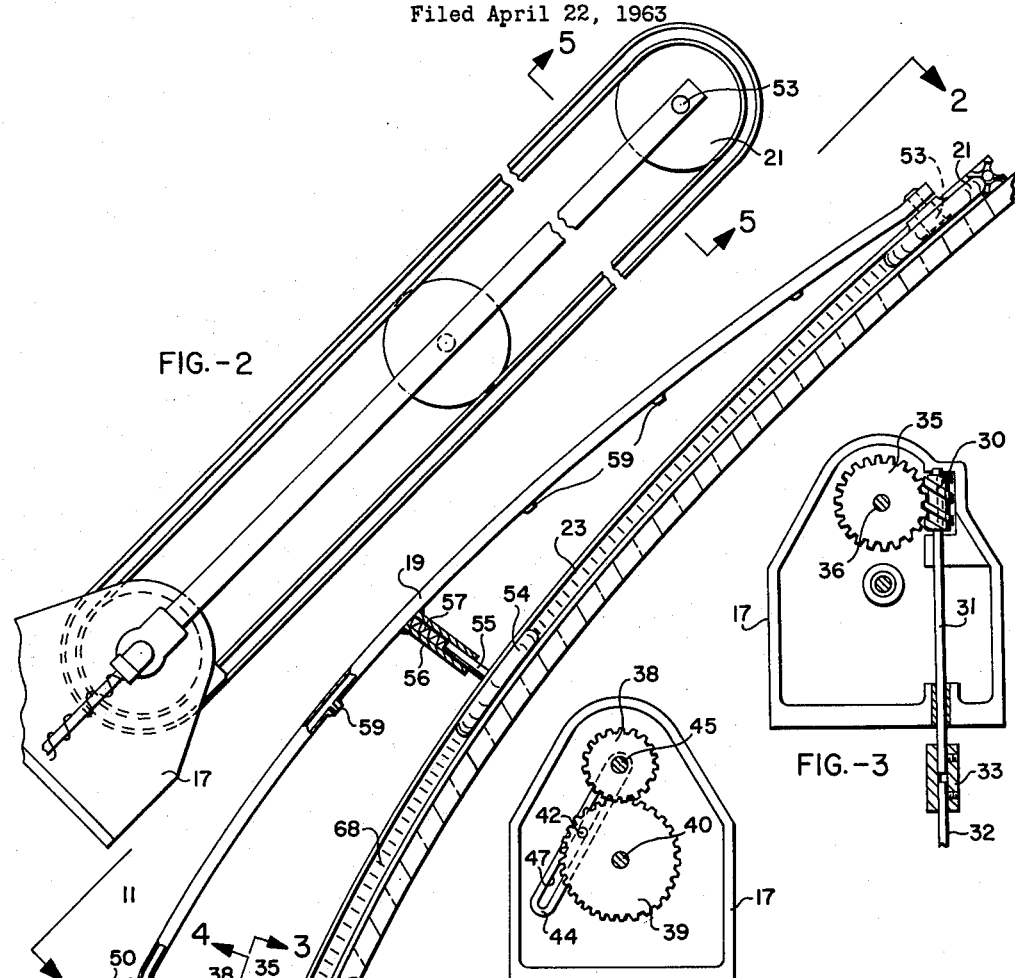
INVENTOR.
PASQUALE M. CAPASSO
BY
*Watts ; Fisher*
ATTORNEY 3,147,505
WIPER DEVICE
Pasquale M. Capasso, Cleveland, Ohio, assignor to Pasquale M. Capasso, Inc.
Filed Apr. 22, 1963, Ser. No. 274,623
9 Claims. (Cl. 15—250.04)

This invention relates to windshield wipers and more particularly to a novel and improved windshield wiper blade and arm assembly.

Modern day windshield wipers have several material drawbacks. One of these drawbacks is that blades tend to wear unevenly due to abrasive grit and dirt on the windshields and other factors. This uneven wear results in a windshield contacting surface that is uneven and that tends to leave streaks and in other manners improperly cleanses the windshield. Another shortcoming of modern day wiper blades is that ice and snow collect on the blades during inclement weather.

The present invention overcomes these and other disadvantages through the provision of a wiper blade in the form of an endless belt reeved over a pair of pulleys. The belt is caused to rotate and this belt rotation overcomes both of the above-listed disadvantages and provides additional advantages. Since the belt is rotating, any worn portions will be constantly moved to different locations along the vertical reach of the blade so as to avoid streaking across the windshield as the blade is oscillated. Moreover, because the blade is a belt, any tendency to streak will be corrected by the blade itself since there are at least two wiping surfaces provided. In addition, since the same blade portion does not pass repeatedly over the abrasive spot, but rather the entire blade is longitudinally moving and likely to pass over the abrasive spot, wiping surface wear tends to be evenly distributed. In the preferred arrangement a total of four wiping surfaces are provided, as will be described presently. The rotation of the blade has a further advantage of preventing a snow or ice build-up on the blade during inclement weather, thereby maintaining the blade in a condition for proper functioning. As the blade moves around the pulleys any ice accumulation is broken and swept free of the field of vision.

In the preferred arrangement, the blade is made symmetrical in cross-section so that its outer surfaces are substantially identical to the inner surfaces. With this construction a further advantage of the present invention is obtained in that when the windshield-contacting surfaces do become worn, the blade may be rolled presenting fresh wiping surfaces to the windshield and, thereby, increasing blade life.

Another feature of the invention resides in the provision of an electrical heating element encased within the blade, which element heats the blade and inhibits the build-up of ice on the blade.

Accordingly, an object of the present invention is to provide a new and improved windshield wiper assembly wherein the wiper element tends to wear evenly throughout its length and is essentially non-streaking.

Another object of the present invention is to provide a new and improved windshield wiper assembly wherein the wiper element moves longitudinally as it oscillates laterally over windshield surface and minimizes streaking caused by nicks or wear spots in the wiper element.

Still another object of the present invention is to provide a new and improved windshield wiper assembly wherein the wiper element breaks up ice and other clinging accumulations as it moves over the windshield surface.

A further object of the present invention is to provide a new and improved windshield wiper assembly wherein an overlapping wiping action is provided which eliminates streaking.

Yet another object of the present invention is to provide a new and improved windshield wiper assembly wherein a single wiping element has more than one wiping surface which may be used alternately to increase the useful life of the wiper element.

A final object of the present invention is to provide a new and improved windshield wiper assembly wherein an electrical heating element is energized and inhibits the build-up of ice has the blade moves longitudinally and oscillates over the windshield surface.

Other objects and a fuller understanding of the invention may be had by referring to the following description and claims taken in conjunction with the accompanying drawing in which:

FIGURE 1 is a side elevational view, with portions removed and parts in cross-section, of a preferred form of the windshield wiper assembly of the present invention;

FIGURE 2 is a foreshortened view of the present windshield wiper assembly taken along line 2—2 in FIGURE 1;

FIGURE 3 is a section view taken along line 3—3 in FIGURE 1;

FIGURE 4 is a section view taken along line 4—4 of FIGURE 1;

FIGURE 5 is a section view taken along line 5—5 in FIGURE 2;

FIGURE 6 is a cross-sectional view similar to FIGURE 5 of another form of the wiping element of the present invention.

Referring now to the drawings wherein like reference characters indicate like or corresponding parts throughout the several views, a preferred form of a windshield wiper assembly 11 is illustrated in a cleaning position on a cured windshield 12. The windshield 12 is mounted by a suitable resilient seal 13 on a metal body 14.

The wiper assembly 11 includes a gear support and housing 17 fixed to the body 14 as by a fastener 18, a wiper support arm 19 rotatably secured to the gear housing 17, drive and idler pulleys 20, 21 carried by the housing 17 and the wiper arm 19 respectively, and a continuous wiper belt 23 reeved on the pulleys 20, 21 and engaging the windshield 12. A motor 24 is provided for driving the windshield wiper assembly 11 so that the wiper arm oscillates across the windshield while the wiper belt 23 moves longitudinally around the pulleys 20, 21. When the windshield wiper assembly 11 is used on a motor vehicle, the motor 24 is an electrical motor suitable for the voltage system used in a particular vehicle. The motor 24 has a double ended shaft 25 to synchronize the motion and positioning of two of the wiper assemblies 11, one on the driver's side and the other on the passenger's side.

The gear case housing 17 contains suitable mechanism for rotating the drive pulley 20 and oscillating the wiper support arm 19 when driven by the rotating shaft 25 of the motor 24. The driving mechanism includes a worm gear 30 which is fixed to a main drive shaft 31. A flexible shaft 32 and shaft couplings 33, 34 connect the main drive shaft 31 to the motor shaft 25. A worm wheel 35 meshes with the worm gear 30 and is supported by and fixed to a pulley drive shaft 36. The pulley drive shaft 36 is journaled in a bearing block portion 22 of the housing 17. The pulley shaft 36 includes a splined end 37 which extends outside of the housing 17 and is received within a splined centerbore in the drive pulley 20.

The drive pulley 20 is rotated by the motor 24 through the worm gear 30, the worm wheel 35, and the drive shaft 36 and causes the wiper belt 23 to travel endlessly around the idler pulley 21. The other end of the pulley shaft 36 is keyed to a driving spur gear 38 so that the drive pulley 20 and the spur gear 38 rotate simultaneously about the same axis.

As shown in FIGURES 1 and 4, a driven spur gear 39 meshes with the driving spur gear 38. The driven spur gear 39 is keyed to a shaft 40 which is journaled in a bearing block portion 41 of the gear housing 17. A crank pin 42 projects from a bore in the driven spur gear 39 off center of its axis of rotation about the shaft 40.

An oscillating lever arm 44 is splined to the end of an oscillating shaft 45. The oscillating shaft 45 is journaled in a bearing block portion 46 of the gear housing 17. The oscillating lever arm 44 has a crank pin slot 47 throughout the greater portion of its length which comes in overlying relation to the spur gear 39. The projecting end of the crank pin 42 is received within the crank pin slot 47. As the spur gear rotates and the crank pin 42 moves in a circle, the lever arm 44 is caused to angularly oscillate by the motion of the crank pin 42 sweeping back and forth within the crank pin slot 47. The circle described by the crank pin 42 then defines the angular limits of oscillation of the oscillating lever arm 44.

A wiper arm mounting hub 50 is fixed to the oscillating shaft 45 as by a setscrew 51. When the lever arm 44 oscillates between its angular limits defined by the circle of movement of the crank pin 42, the hub 50 also oscillates through the same angular limits. The mounting hub 50 is preferably made of an insulating material which is molded or otherwise suitably secured in a supporting manner around the end of the wiper arm 19. As thus supported in the hub 50, the wiper arm 19 is maintained in a spaced, electrically insulated relation from the end of the oscillating shaft 45. An insulating material which has been found suitable for making the mounting hub 50 is a nylon material having the proper strength characteristics.

The wiper arm 19 is an elongated piece of spring steel or other suitable material which will resiliently urge the wiper belt 23 against the windshield 12. The idler pulley 21 is rotatably secured to the free or swinging end of the wiper support arm 19 by a bearing pin 53. The bearing pin 53 is rigidly secured to the wiper arm 19 so that the idler pulley 21 rotates relative both to the pin 53 and the wiper arm 19.

Normally, when the wiper belt 23 is reeved on the pulleys 20, 21, this sufficiently tenses the wiper arm 19 to maintain the wiper belt taut and against the windshield 12. In the case of some of the unusually sharply curved windshields, it is sometimes desirable to assure that the portion of the moving wiper belt 23 intermediate of the ends of the wiper arm is maintained in constant contact with the windshield regardless of the amount of deflection experienced by the wiper belt 23 as it sweeps across the curved windshield 12. To this end, an adjusting idler pulley 54 is provided to maintain windshield engagement. The adjusting idler pulley 54 is rotatably mounted on a shaft 55. The shaft 55 is slidably disposed within a support tube 56 which is in turn secured to the wiper arm 19. A compression spring 57 is disposed within the support tube 56 and urges the shaft 55 away from the support arm and towards the windshield.

As shown in the drawings, the wiper support arm 19 is a rectangular stainless steel tube. The interior chamber of the tube acts as a conduit for a cleansing fluid to be sprayed on the windshield. A plurality of spray nozzles 59 are provided on the underside of the wiper arm and have through fluid passages which provide communication between the interior of the wiper arm and the outside. The spray nozzles 59 are pointed in the direction of the windshield 12 so as to spray the cleansing fluid between the oppositely moving portions of the wiper belt 23. Spraying the cleansing fluid between the oppositely moving portions of the wiper belt 23 in this manner minimizes the loss of cleansing fluid. Cleansing fluid is supplied to the wiper arm 19 by a suitable reservoir and pump mechanism (not shown) through a plastic tube 61 which is connected to the wiper arm through a metallic right-angle coupling 62.

The wiper belt 23 is made of a resilient material such as rubber, polyurethane, or other suitable elastomeric material. The wiper belt 23 has a modified X cross-section so that each of the oppositely moving portions of the wiper belt 23 present two moving blades for a total of four blade edges which contact the windshield 12. As shown in FIGURE 5, the pulley belt 23, has a total of four wiping corners 63, each corner having two wiping surfaces 64. A wiping surface on each of two of the corners is always in contact with the windshield 12. A circular pulley groove 65 is formed between each of the wiping corners for a total of four pulley grooves 65. The plurality of pulley grooves 65 and the corresponding wiping surfaces 64 permit the wiper belt 23 to be periodically removed, rolled and remounted on the pulleys 20, 21 by a different pulley groove to increase the useful life of the wiper belt 23. In FIGURE 6, a similar wiper belt 23' has a V-shaped pulley groove 65' between wiping surfaces 64' on wiping corners 63'.

A heating element in the form of a resistance wire 67, coiled in an endless coil is disposed in the center of the wiper belt 23 throughout its length. The coiled resistance wire 67 is molded in the wiper belt 23 and has outer surfaces 68 exposed to make electrical contact with the driving and idler pulleys 20, 21.

The resistance wire 67 is energized from a suitable power source 70. One terminal of the power source 70 is grounded as by the ground connection 71. The other terminal of the power source 70 is connected through a suitable switch 72 by a conductor 73 to the metallic coupling 62 which is in metal-to-metal contact with the support arm 19. The support arm 19 is an electrical conductor and continues the electrical circuit to the metallic bearing pin 53 which extends the circuit to the metallic idler pulley 21. The idler pulley 21 makes electrical contact with the exposed surfaces 68 of the resistance wire 67 so that heating current runs through both of the oppositely moving portions of the wiper belt 23 to the driving pulley 20 which is also metallic. The metallic driving pulley 20 is splined on the end of the metal shaft 36 which, in turn, is journaled in the metallic bearing block portion 22 of the housing 17. The driving mechanism and the housing 17 are grounded to the chassis at the fastener 18 to complete the electrical circuit for energizing the resistance wire 67 from from the power source 70.

In summary, the present invention is believed to comprise essentially a wiper assembly comprising a support arm oscillating over a surface to be cleaned, a pulley assembly carried by the support arm, an endless wiper belt reeved over the pulley assembly and engaging the surface, and a suitable driving mechanism to cause the wiper belt to move longitudinally relative to the surface as the support arm oscillates over the surface.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A windshield wiper assembly for cleaning the surface of a windshield mounted in a frame, said assembly comprising:

(a) a support arm;

(b) means pivotally mounting one end of said support arm to the frame so that the support arm is disposed for pivotal oscillating movement over the windshield surface;

(c) a pulley assembly carried by said support arm, said pulley assembly comprising first and second spaced pulleys, said first pulley being disposed adjacent the pivotally mounted end of the support arm, and said second pulley being disposed near the other, free end of said support arm;

(d) an endless wiper belt reeved around the said pulleys; and, (e) drive means connected to said pulley assembly and to said support arm to cause the wiper belt to move longitudinally as the support arm oscillates over the windshield surface.

2. A wiper assembly for cleaning a surface comprising:

(a) a support arm mounted for oscillating movement over the surface;

(b) a pulley assembly carried by the support arm;

(c) an endless wiper belt reeved around the pulley assembly and disposed to engage the surface;

(d) a drive means connected to said pulley assembly to cause the wiper belt to move longitudinally as the support arm oscillates over the surface.

3. The combination of claim 2 wherein:

(e) said drive means is connected to said support arm and oscillates the support arm simultaneously with longitudinal movement of the wiper belt.

4. The combination of claim 2 wherein:

(e) said pulley assembly is a pair of spaced pulleys; and, (f) said wiper belt as reeved around the pulley has substantially straight, parallel, oppositely moving portions.

5. The combination of claim 4, including:

(g) a power source having output terminals;

(h) said pulleys are electrically conductive, one of said pulleys is connected to one output terminal of the power source, and the other of said pulleys is connected to the other output terminal; and, (i) said wiper belt includes an endless heating element centrally disposed in said wiper belt, said heating element having exposed portions engaging said pulleys and completing an electrical circuit through said power source.

6. The combination of claim 5 wherein:

(j) said support arm is electrically conductive and connects one of the pulleys to the power source.

7. The combination of claim 4, wherein:

(g) said support arm is tubular and has a longitudinal extending interior fluid conduit; and, (h) a spray nozzle is secured to the support arm and has a through passage directing fluid from within the conduit toward the surface between the oppositely moving portions of the wiper element.

8. The combination of claim 7 wherein:

(i) a plurality of spray nozzles are secured to said support arm in longitudinally spaced relation, and have through passages directing fluid from within the conduit toward the surface.

9. The combination of claim 4 wherein:

(g) said wiper belt is X-shaped in cross-section and has four wiping corners two of which always engage the surface.

References Cited in the file of this patent
UNITED STATES PATENTS

| | | |
|---|---|---|
| 1,963,139 | Mattoon | June 19, 1934 |
| 2,896,245 | Hopponen | July 28, 1959 |
| 3,025,555 | Ramirez | Mar. 20, 1962 |